April 29, 1930. L. H. SCHROEDER ET AL Re. 17,653

ROTARY BOX BLANKING MACHINE

Original Filed Jan. 4, 1923 3 Sheets-Sheet 1

Inventors
Louis H. Schroeder
and Joshua Wagner
By their Attorneys
Prindle, Wright Neal & Bean April 29, 1930. L. H. SCHROEDER ET AL Re. 17,653
ROTARY BOX BLANKING MACHINE
Original Filed Jan. 4, 1923 3 Sheets-Sheet 2
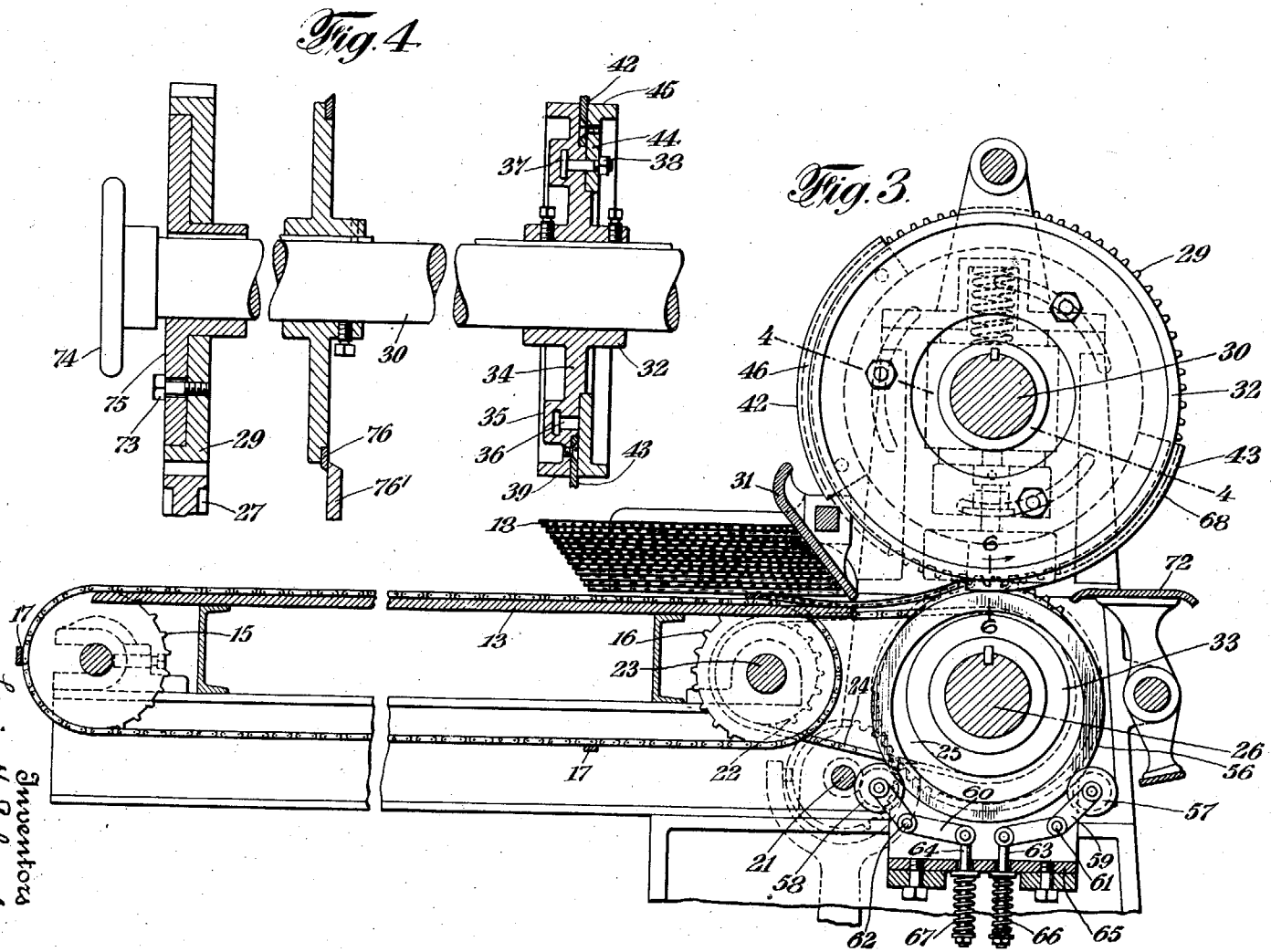
Inventors
Louis H. Schroeder
and Joshua Wagner
By their Attorneys
Prindle Wright Neal & Dean April 29, 1930. L. H. SCHROEDER ET AL Re. 17,653

ROTARY BOX BLANKING MACHINE

Original Filed Jan. 4, 1923 3 Sheets-Sheet 3

Inventors
Louis H. Schroeder
and Joshua Wagner
By their Attorneys
Prindle, Wright Neal & Dean Reissued Apr. 29, 1930 Re. 17,653

UNITED STATES PATENT OFFICE

LOUIS HENRY SCHROEDER, OF WOODHAVEN, AND JOSHUA WAGNER, OF BROOKLYN, NEW YORK, ASSIGNORS TO PROGRESSIVE CORRUGATED MACHINERY CO., INC., OF BROOKLYN, NEW YORK, A CORPORATION OF NEW YORK

ROTARY BOX-BLANKING MACHINE

Original No. 1,493,404, dated May 6, 1924, Serial No. 610,604, filed January 4, 1923. Application for reissue filed September 10, 1925. Serial No. 55,634.

This invention relates to box blanking machines and particularly to an improved rotary machine designed to automatically cut slots, crease and trim a blank ready for folding into a box.

The object of the invention is to provide a box blanking machine of the rotary type wherein blanks may be fed in successively and slots cut on opposite edges and creased between the cut slots as they pass through the machine.

Another object of the invention, more specifically, is to provide a blanking machine in which a floating ring or creasing die is provided which acts in the capacity of normally holding the blank in proper place, creasing the blank at the proper place and assisting in cutting the slot at the proper place.

A further object of the invention is to provide a rotary box blanking machine which is simple in construction and which may be quickly and easily adjusted to accurately cut and crease blanks of various lengths and sizes.

A still further object of the invention is to provide a rotary blanking machine in which a floating ring co-acts with the male cutters of the machine in cutting the blank fed through the machine and in ejecting the severed or cut material.

In the accompanying drawings—

Figure 2:
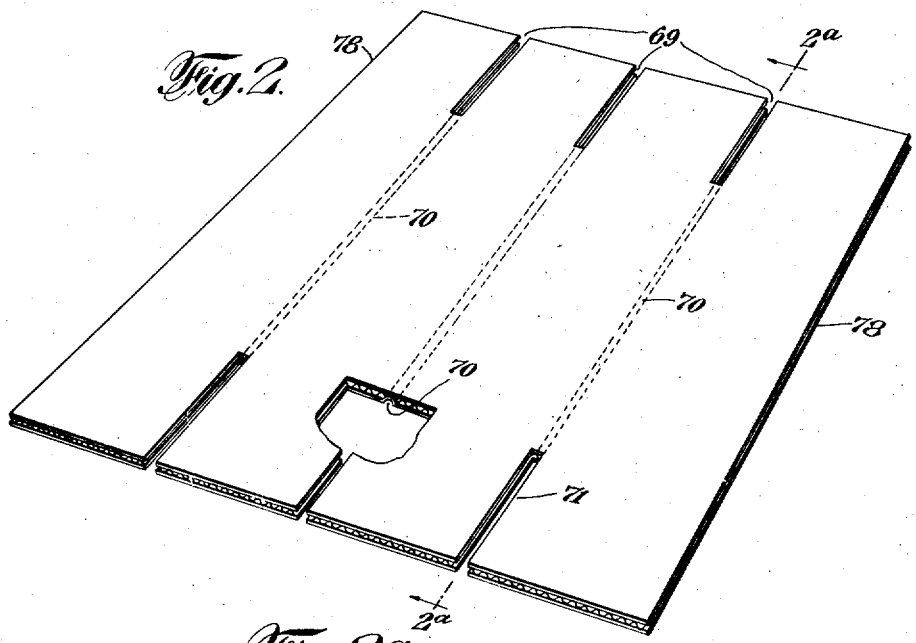
Figure 2 is a perspective view, on a greatly enlarged scale, of a blank after the same has passed through the machine shown in Figure 1, certain parts being broken away for illustrating the creased formation.
Figure 2A:
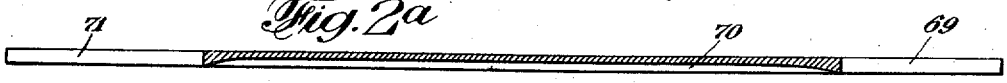

Figure $2^a$ is a sectional view through Figure 2 approximately on line $2^a$—$2^a$.

Figure 1:
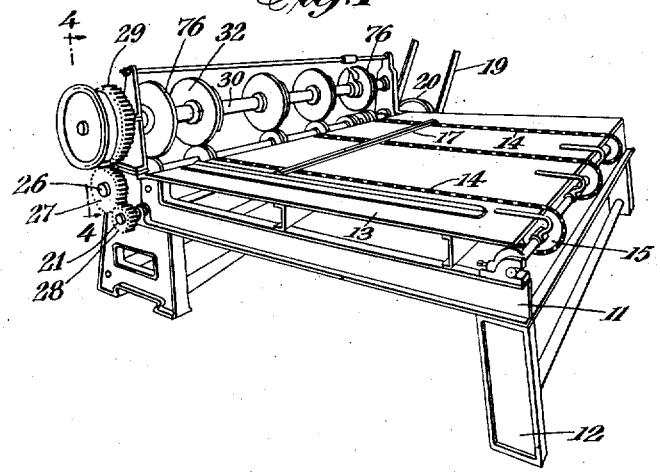
Figure 1 is a perspective view, on a reduced scale, of a machine disclosing an embodiment of the invention.

Figure 3 is a longitudinal vertical section through the machine shown in Figure 1, the same being on a greatly enlarged scale.

Figure 4 is a fragmentary sectional view approximately on line 4—4 of Figure 1, the same being on a greatly enlarged scale, said figure also being taken partly on line 4—4 of Figure 3.

Figure 5:
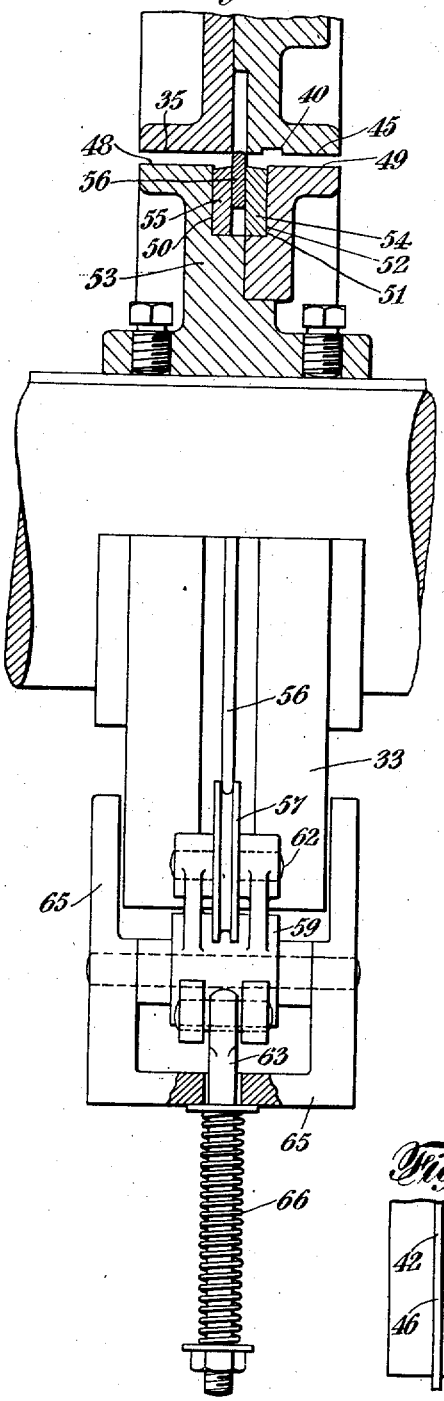

Figure 5 is a view partly in section and partly in elevation of the floating ring and associated parts, when floating ring is in normal position and no blank is passing through the machine.

Figure 6:
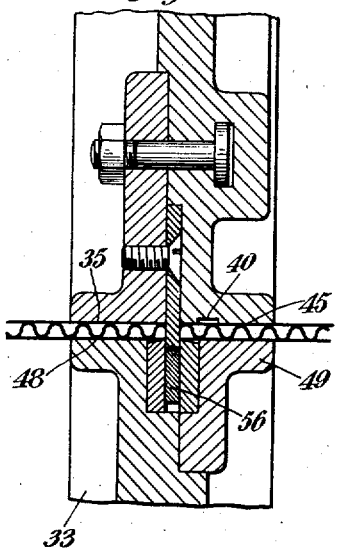

Figure 6 is an enlarged fragmentary sectional view through Figure 3 approximately on line 6—6, showing the position of the floating ring while the knife segment is cutting a slot in the blank.

Figure 7:
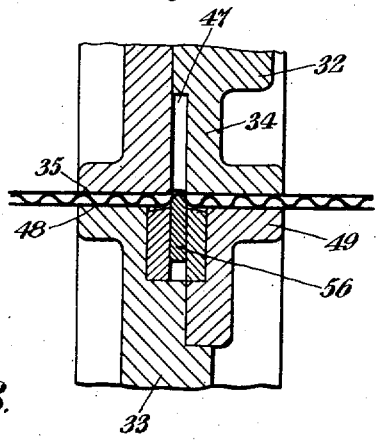

Figure 7 is a view similar to Figure 6 but showing the floating ring and other parts in a different position, that is after the first slot has been cut and the floating ring is forming the crease, at the same time ejecting the waste from the cut slot.

Figure 8:
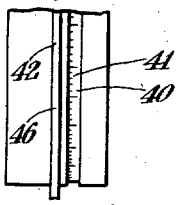

Figure 8 is a detail fragmentary plan view illustrating a scale used in connection with the slotting or cutting knife.

Referring to the accompanying drawings by numerals, 11 indicates a frame of any desired kind which includes suitable standards 12 and any desired number of cross pieces, brackets and the like for supporting different shafts and other parts of the machine. On the frame 11 is arranged a platform 13 over which a number of chains 14 are adapted to pass, said chains being supported by suitable sprocket wheels 15 and 16, said sprocket wheels in turn being carried by suitable shafts mounted on the frame. A number of feeding bars 17 are connected to these chains so as to feed the various blanks 18 to the creasing and slotting rollers at the proper time. Power is applied by a belt 19 or other suitable means to the pulley 20 which is rigidly secured to the shaft 21 and from said shaft power is taken off by different means to the respective driven members. For instance, a sprocket wheel 22 is secured to the shaft 23 carrying sprocket wheel 16, said sprocket wheel 22 accommodating the driving chain 24, which chain passes over a suitable sprocket wheel 25 secured in any desired manner to the shaft 21. The gear wheel 27 also meshes continually with the large gear wheel 29, which large gear is bolted to the disk 75 and the disk 75 is rigidly secured to the shaft 30. By having all parts connected to the single driving shaft 21, they will operate in unison and be properly timed to function in the proper sequence.

From Figure 3 it will be noted that the blanks 18 are held on the platform 13 by a suitable stop 31, which has the bottom edge thereof spaced a short distance above the platform to permit the lowermost blank 18 to be forced off of the platform by one of the feed bars 17 so as to be slotted and creased as hereinafter fully described. As the blank is forced beneath the stop 31, it is engaged by the respective wheels 32 and 33 and pulled along and at the same time cut and creased by suitable knives and creasing dies. The wheel 32 is shown in section in Figures 4, 5, 6 and 7 and from this section it will be noted that the wheel is provided with a central flange or web 34 having an annular enlargement 35 for accommodating a dove-tail slot 36, which slot has an opening at some point whereby the heads 37 of the respective bolts 38 may be inserted and the bolts moved around to the desired point. It will be noted that the flange 34 merges into a peripheral smooth surface 39, which surface is slightly reduced in diameter near one edge and on this reduced surface 40 is arranged a scale 41 co-acting with the adjustable blade 42 whereby the blade may be accurately set to cut any length slot or to accommodate any size blank. Co-acting with the adjustable blade 42 is a stationary blade 43 which is bolted or otherwise rigidly secured to the web 34 of wheel 32, said blade having its periphery preferably hollowed out or grooved as indicated at the bottom of Figure 4. The adjustable blade 42 is also grooved or hollowed out on the periphery as shown at the top of Figure 4 and also shown in Figure 6. The blade 42 is bolted or otherwise rigidly secured to an adjustable ring 44 which has a peripheral surface 45 co-acting with the surface 39 for presenting a face adapted to engage the blank and hold the same in place as well as urge the same forward during the slotting and creasing operation. The adjustable ring 44 is an annular ring and is clamped in any desired position by the respective bolts 38, said ring of course, being set manually and the operator during the setting operation being guided by the graduations 41 which are properly calibrated in inches or in any other manner as preferred. Also, the knife 42 is preferably provided with one or more indicating lines 46 to co-act with the graduations 41. It will be noted particularly from Figure 7 that the web 34 of wheel 32 is provided with an annular offset or recess 47 in which the respective cutting or slotting blades 42 and 43 are positioned.

Co-acting with the wheel 32 is a lower wheel 33 which is provided with surfaces 48 and 49 co-acting with the surfaces 39 and 45 to present a feeding roller structure for forcing the blanks through the machine. The wheel 33 is provided with an annular recess 50 co-acting with the annular recess 51 formed in the ring 52 which is bolted or otherwise rigidly secured to the web 53 of wheel 33. By the provision of the notches 50 and 51, an annular groove is provided in the periphery of wheel 33 in which is positioned annular shearing rings 54 and 55, said shearing rings being spaced apart by the floating ring or creasing die 56. There is a fairly snug fit between the ring 56 and the respective rings 54 and 55 though the ring 56 is permitted a free movement. Ordinarily the floating ring 56 is supported substantially in the position shown in Figures 5 and 7. Preferably, the support consists of a pair of grooved wheels 57 and 58 arranged so that the floating ring 56 will fit therein, said wheels being rotatably supported on levers 59 and 60, said levers being pivotally mounted at 61 and 62 on the frame 11 or on a bracket connected therewith as may be desired. The free ends of the levers 59 and 60 are pivotally connected with the rods 63 and 64 which extend downwardly through the plate 65 supported in any desired manner on the frame 11 whereby the springs 66 and 67 may act on the ends of the rods 63 and 64 and on the plate 65 for resiliently supporting the wheels 57 and 58 and the floating ring 56. This resilient support causes the floating ring or creasing die 56 to normally remain in the position shown in Figures 5 and 7 though it may be forced therefrom by the slotting blades 42 and 43 as shown in Figure 6 without interfering with the rotation of the ring or wheel 33.

In operation, after the parts have been properly set, a supply of blanks 18 is provided as shown in Figure 3 and at the proper time one of the feed bars 17 will strike the end of the lowermost blank and force the same into substantially the position shown in Figure 3. As soon as the blank comes in contact with the cutting knife 43, it is engaged by the roughened surface or teeth 68 arranged adjacent the respective ends thereof and is pulled by the knife or cutter and also by the action of the respective wheels 32 and 33. The first part of the movement of the blank between the wheels 32 and 33 will cause the slotting knives 43 to cut the respective slots 69, said cutter and associated parts assuming the position shown in Figure 6. It will be noted that when the knives 42 and 43 are in action, they not only shear the blank 18 but depress the floating ring or creasing die 56. The action of the creasing die as it is pressed upwardly by the springs 66 and 67, causes a straight cutting or shearing action so that the walls of the slots 69 will be straight and not bent or turned over. After the respective knives 43 have performed their functions, they will move away from the ring 56 and said ring, by reason of the pressure of the springs 66 and 67, will crease the blank 18 as indicated in Figs. 2 and 7 so that the crease 70 will extend from the slots 69 to the slots 71, which latter slots are formed by the knife 42. It will be noted that by varying the compression of the springs 66 and 67 by means of a nut, it will regulate the depth and prominence of the crease 70. It will be seen from Figure 2[a] that the full depth of the crease will not exist adjacent to the slots, but starting about one-half inch away from the slots, the depth or prominence of the crease starts to diminish or taper from its full depth to nothing at the slots. This has the effect of greatly increasing the strength of the blank adjacent to the beginning of the slots. It will be understood that one, two, three or more of the sets of wheels 32 and 33 may be used as desired according to the number of slots 69 and 71 desired. Ordinarily, there are only three slots desired and by constructing the parts as described the slots on opposite edges of the blank are in direct alignment and also are in alignment with the various grooves or creases 70.

It will be noted that the floating ring 56 moves upwardly to its normal position as soon as the respective knives pass, and, consequently, this floating ring, being of larger diameter than the wheel 33, will act as an ejector for ejecting the waste material cut from the blank 18. The blank as it moves between the wheels 32 and 33 will pass onto the platform 72 and will be eventually discharged therefrom. In case it should be desired to adjust the parts to cut a different length slot in the blank to that shown, the clamping screw 73 is loosened and the hand wheel 74 rotated, said hand wheel being rigidly secured to the shaft 30. The wheel 32 is also keyed or otherwise secured to the shaft 30. The rotation of the hand wheel 74 manually, rotates the shaft 30 independent of the driving mechanism and, consequently, the fixed blade 43 may be adjusted to the desired point. After this has been done, the clamping screw 73 is tightened and then the adjustable blade 42 is adjusted and clamped in its new position so as to give the correct distance between the slots 69 and 71. The cutting blades and all the other parts of the respective wheels 32 and 33 are then in position for receiving the new blanks. It will be noted from Figure 4 that the wheel 32 is not only splined to the shaft 30 but is held in place by set screws so that it may be adjusted longitudinally of shaft 30 for spacing the slots 69 as desired. The wheel 33 is constructed in a similar manner as indicated in Figure 5 so that it may be correspondingly adjusted. It will be noted that the member or holding structure 65 associated with the supporting mechanism for the floating ring, also overlaps wheel 33 and thus moves or shifts along with the wheels 32 and 33 during axial adjustment of the latter, so that the floating ring is always in the same plane with the slotting knife segments 42 and 43. This will automatically insure that the creases 70 are in perfect alignment with the slots 69 and 71.

As shown in Figure 4, a set of trimming knives 76 and 76′ are provided and adjustably mounted on the shaft 30 so as to trim the blank as it passes through the machine and thereby produce a nice accurate edge to the finished article. It will be noted that these knives may be adjusted to suit any size blank and to trim the blank to any desired extent.

What we claim is:

1. In a rotary box blanking machine of the character described, a slotting structure and a creasing structure, said creasing structure being formed with a floating creasing ring.

2. In a rotary box blanking machine of the character described, a plurality of slotting structures, each of said slotting structures being provided with a stationary knife, an adjustable ring associated with the stationary knife, and a knife rigidly secured to said ring, said knife being adjustable with the ring toward and from the last mentioned knife, and means co-acting with said knives for causing the knives to produce a clean cut and causing a creasing action between said knives.

3. In a rotary box blanking machine, a creasing structure comprising a wheel having an annular groove in the periphery thereof, a floating ring arranged in said groove, and means for yieldingly holding said ring in an elevated position.

4. In a rotary box blanking machine of the character described, a creasing structure comprising a wheel having an annular groove therein, a ring mounted in said groove, and resilient means acting on the ring for normally holding the same in an elevated position.

5. In a rotary box blanking machine of the character described, a creasing structure comprising a wheel having an annular groove in the periphery, a pair of spaced slotting rings arranged in said groove and acting as part of a cutting structure, and a resiliently supported floating ring arranged between said first mentioned rings.

6. In a rotary box blanking machine of the character described, a plurality of slotting structures, each of said slotting structures being provided with a stationary knife, an adjustable ring associated with the stationary knife, and a knife rigidly secured to said ring, said knife being adjustable with the ring toward and from the last mentioned knife, means for co-acting with the knives for causing the knives to produce a clean cut and causing a creasing action between said knives, said means including a floating ring, and springs for causing said ring to function, the action of said rings being such as to cause the crease to decrease in depth toward the slots.

7. In a rotary box blanking machine, a supporting table, means for feeding blanks from said table, a plurality of slotting knives for slotting opposite sides of said blanks, and creasing means for creasing said blanks between the slots, said creasing means including a floating ring, and springs for pressing the floating ring against the blanks, said ring co-acting with the knives to produce a crease gradually increasing in depth from the slots whereby the blanks will be strengthened adjacent the ends of the slots.

8. In a rotary box blanking machine of the character described, means for slotting a blank on opposite edges, and means for creasing the blank between said slots, said creasing means including a floating ring which co-acts with the knives for ejecting the material cut from the blank as the slots are formed.

9. In a rotary box blanking machine, a cutter wheel provided with a plurality of projecting knives and a creasing structure comprising a wheel having a peripheral groove therein, a pair of slotting rings mounted in said groove, said rings being spaced apart and positioned so that said knives may pass therebetween during the cutting operation, a floating ring arranged between said first mentioned rings, rollers acting on said last mentioned rings for supporting the same, and springs acting on said rollers for resiliently supporting the rollers.

10. In a rotary box blanking machine of the character described, a creasing structure, said creasing structure including a wheel having a peripheral groove, a ring arranged in said groove, said ring having a bore of greater diameter than the groove whereby it floats freely in the groove, a pair of wheels acting on said ring for normally supporting the same in an elevated position, a lever for each of said wheels, and a spring acting on each of the levers for normally holding the same in a given position.

11. In a rotary box blanking machine, means for slotting a blank on opposite edges, and means for creasing the blank between said slots, said slotting and creasing means being constantly interengaged and adjustable simultaneously for varying the distance apart of the slots and creases and for automatically maintaining the creases in alignment with the slots.

12. In a rotary box blanking machine, creasing means including a creasing roller, and slotting means for slotting the opposite edges of the blank, said slotting means including a roller having a groove therein, said roller being positioned so that the creasing roller will project into said groove whereby all of the parts are interengaged and are adjustable simultaneously for different sized blanks.

13. In a rotary box blanking machine, a plurality of sets of slotting members adapted to be adjusted toward and from each other, said slotting members having parts which interengage whereby the units are adjusted as one member, and a creasing roller for each of the slotting units, said creasing rollers continually overlapping part of the slotting structure whereby they are automatically shifted toward each other with the slotting structures.

14. In a paper machine, the combination of a pair of co-operating disks for slotting a blank, a scoring wheel for scoring said blank and means whereby said slotting disks and scoring wheel are connected to move in unison in axial directions.

15. In a paper machine, the combination of a pair of co-operating disks for slotting a blank, one of said disks having annular cutting edges spaced apart and forming an annular groove and a scoring wheel extending into said groove whereby said slotting disks and scoring wheel are maintained in predetermined fixed relation to each other in respect to axial movement.

16. In a slotting and scoring machine, the combination of adjustable co-operating rotatable discs for slotting a blank, a rotatable circular scorer for scoring said blank, one of said discs having associated therewith a groove into which said scorer extends and through which it moves during rotation, said groove being adapted to partake of the axial adjustment of the slotting discs and thereby adjust the scorer to correspond with the adjustment of said slotting discs.

17. In a paper machine, the combination of circular disk for scoring a blank and slotting means for slotting said blank, said scoring disk and slotting means being connected to move in unison in axial directions.

18. In a box blanking machine, a disk for creasing a blank, and slotting means for slotting the blank on opposite edges, the various parts of the slotting means interengaging and the creasing disk interengaging with part of the slotting means whereby the creasing disk and slotting means are automatically moved at the same time when the machine is being adjusted to accommodate different size blanks and are at all times maintained in alignment so that the slots will always be in alignment with the creases.

19. In a rotary box blanking machine, the combination of a pair of cooperating disks for slotting the blank, a rotary disk for scoring said blank, and means whereby said slotting disks and scoring disk are connected to move in unison in axial directions, said means including a member constrained to move axially both with the scoring member and one of the slotting disks.

20. A rotary box blanking machine having a slotting head provided with a peripheral groove, one or more slotting blades adapted to engage in said groove, a rotary circular scoring member associated with said slotting head for simultaneous axial adjustment therewith to maintain alinement between slots and scores, together with a rotary cylindrical member against which the scoring disk presses the blank during the scoring operation, said blades and last mentioned member being also axially adjustable.

21. In a paper machine, the combination of a pair of shafts, co-operating slotting disks mounted on said shafts, a member, in fixed relation to one slotting disk in respect to axial movements of said disks, and a scoring disk rotatably mounted on said member and maintained thereby in predetermined fixed relation to slotting disks 22. In a paper machine, the combination of a pair of shafts, co-operating slotting disks mounted on said shafts, one of said disks having an annular cutting groove, a member in fixed relation to one slotting disk in respect to axial movement of said disk, and a scoring disk rotatably mounted on said member and extending into said groove whereby said slotting disks and scoring disk are maintained in predetermined fixed relation to each other.

23. In a rotary box blanking machine, the combination of a pair of cooperating disks for slotting the blank, a rotary disk for scoring said blank, and means whereby said slotting disks and scoring disk are connected to move in unison in axial directions, said means including a member constrained to move axially both with the scoring member and one of the slotting disks, said above mentioned disks being all rotatable relative to said member.

In testimony whereof we have signed our names to this specification, dated August 28th, 1925.

LOUIS HENRY SCHROEDER.
JOSHUA WAGNER.